United States Patent [19]

Malm

[11] Patent Number: 5,201,388

[45] Date of Patent: Apr. 13, 1993

[54] SHOCK ABSORBER

[75] Inventor: Tommy Malm, Norrahammar, Sweden

[73] Assignee: Ohlins Racing AB, Sweden

[21] Appl. No.: 860,305

[22] Filed: Mar. 27, 1992

Related U.S. Application Data

[63] Continuation of Ser. No. 711,592, Jun. 6, 1991, abandoned, which is a continuation of Ser. No. 384,970, Jul. 25, 1989, abandoned.

[30] Foreign Application Priority Data

Jul. 28, 1988 [SE] Sweden .......................... 8802750

[51] Int. Cl.⁵ ........................ F16F 9/34; F16F 9/18; B60G 11/26

[52] U.S. Cl. ................................ 188/275; 188/319; 280/707

[58] Field of Search ............ 188/299, 319, 275, 322.15; 280/707, 714; 251/30.02, 30.03, 30.05

[56] References Cited

U.S. PATENT DOCUMENTS

| | | | |
|---|---|---|---|
| 3,414,092 | 12/1968 | Speckhart | 188/275 |
| 4,732,408 | 3/1988 | Ohlin | 280/714 |
| 4,854,429 | 8/1989 | Casey | 188/299 |
| 4,938,499 | 7/1990 | Kawabata | 280/707 |
| 4,948,165 | 8/1990 | Takahashi et al. | 280/707 |
| 4,961,595 | 10/1990 | Fukushima et al. | 280/707 X |
| 4,967,360 | 10/1990 | Fukunaga et al. | 280/707 |

FOREIGN PATENT DOCUMENTS 0330634 8/1989 European Pat. Off. .

Primary Examiner—Robert J. Oberleitner
Assistant Examiner—Peter M. Poon
Agent, Attorney, or Firm—Laff, Whitesel, Conte & Saret

[57] ABSTRACT

A shock absorber works with a variable element (15) which determines the size of a medium passage between the upper and lower sides of a piston (10) in the absorber. The element is arranged so that, with the help of the inertia of its mass, it can carry out a relative displacement movement in its bearing when an acceleration force acts on the mass as a result of the acceleration of the object. The element (15), responsive to the displacement movement, exerts influence on the size of the medium passage.

11 Claims, 3 Drawing Sheets

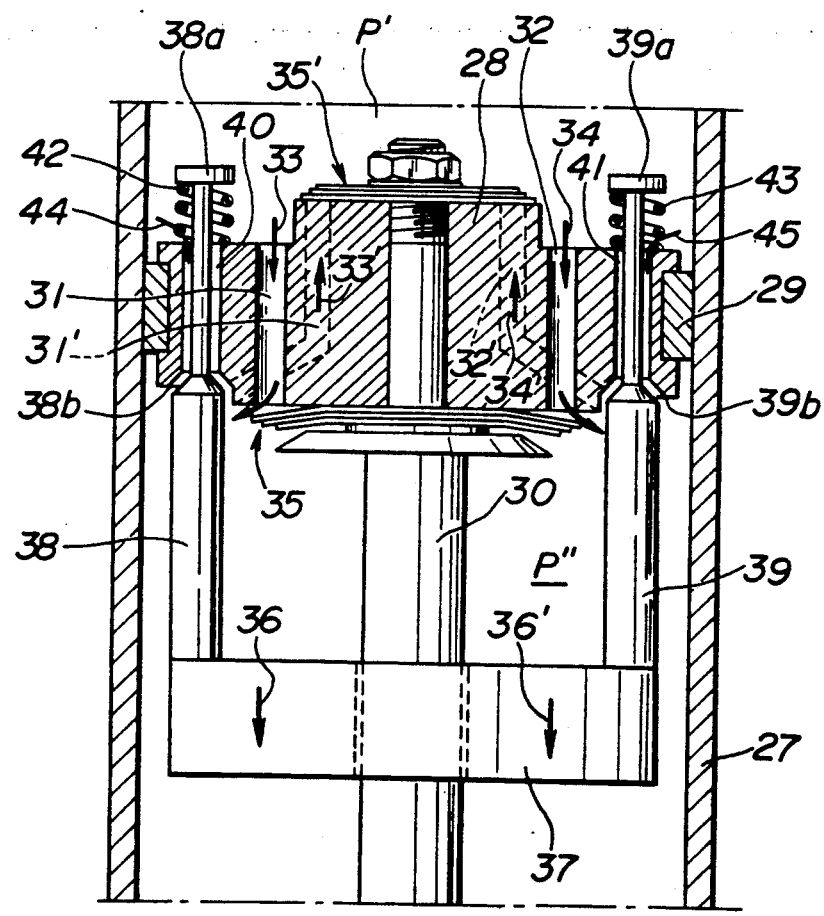

SHOCK ABSORBER

This application is a continuation of application Ser. No. 07/711,592 filed Jun. 6, 1991, now abandoned which was a continuation of Ser. No. 07/384,970, filed Jul. 25, 1989, now abandoned.

The present invention relates to a shock absorber for objects, such as wheels, utilizing a damping function which is varied by means of an element which determines the size of a medium passage between the upper and lower sides of a piston belonging to the absorber.

Shock absorbers with controllable damping effects are previously known. A regulating function can be included in order to adjust the damping independently of the piston speed in the shock absorber. In Swedish patent application 8800602-8 the use of a proportional magnet in such a regulating function is described.

In shock absorbers, difficulties in obtaining an appropriate damping function in all damping instances occur quite commonly. In shock absorbers with controlled and self-regulating functions there remain damping instances in which the set desired damping effects are difficult to maintain by the shock absorber. One such instance occurs when powerful accelerations arise in the direction of a compression of the shock absorber. The regulating function becomes more difficult to achieve and the damping effect delivered by the absorber becomes large, with the result that the shock absorber may function as a rigid suspension point for the object/wheel. In a vehicle, for example, this means that there are conspicuous difficulties in obtaining an appropriate damping effect when the wheel strikes obstacles (for example stones, railway tracks, etc.) projecting from or depressed into the roadway.

The aim of the present invention is a shock absorber which aids the solution of this problem and others. In the main, what can be considered a characteristic of the new shock absorber is that the element is arranged so that, with the help of the inertia of its mass, and/or the inertia of a body connected to the element, it can carry out relative displacement movement in its bearing when acceleration force(s) acting on the mass occur as a result of acceleration(s) of the object and that the element through the aforementioned displacement movement(s) exerts an influence(s) on the size of the medium passage.

In one embodiment the respective displacement movement takes place towards the action of a counter force or regulating force which, when the acceleration force stops, gives the element, in its bearing, a relative return movement with the result that the influence of the element ceases with the help of the mass inertia.

The invention is especially advantageous when the acceleration takes place in the direction of a compression of the absorber. The aforementioned influence of the damping effect can consist of a significant reduction of the acceleration. The aforementioned influence of the size of the medium passage can thus be constituted by the restrictive passage at, for example, the element seating. The influence is thus controlled.

In one embodiment, the element comprises an armature forming part of a proportional magnet where the control force of the magnet is adjustable using electric control signals. The armature is longitudinally movable towards the action of the control force/regulating force to enable, in the regulating function for the achieved damping effects of the absorber, a positional movement relative to a seat which forms part of the medium passage and through which a medium flow dependent upon the damping effect can pass. The armature can thus be provided with or control a needle provided with an end area. The ratio between the control force and the end area determines the amount of a first pressure which counterbalances a pilot flow which forms part of the regulating function and passes the aforementioned seat as long as the acceleration does not occur. The aforementioned first pressure can thus be utilized with a servo function effected with a longitudinally movable slide. In connection therewith, the first pressure acts on the first end of the slide. A second pressure, originating from the larger of the pressures acting on the upper and lower sides of a piston belonging to the absorber, acts on the second end of the slide. The longitudinally movable slide can thus control the principal medium flow via a restriction. The slide with the help of the inertia in the armature causes a reduction in the first pressure, with the result that the longitudinally movable slide significantly and in a controlled manner increases the passage for the principal medium flow. When the acceleration ceases the armature/needle returns to its position, set by the regulating function, with the result that the first pressure is restored.

In another embodiment of the invention, the element is connected to or comprises a body for longitudinal movement in and relative to the piston where it is given a starting position with the help of one or more return elements which can be formed of one or more springs.

By virtue of what is proposed, the shock absorber can in a simple manner be optimally utilized to absorb especially powerful accelerations which may occur in the direction of compression. Upon driving over rocks and other objects projecting or depressed into from the roadway the driving characteristics of the vehicle are improved considerably.

A tentatively proposed embodiment of an arrangement which displays the significant characteristics of the invention is described below with simultaneous reference to the attached drawings in which:

FIG. 4 shows in vertical section a second embodiment example for controlling damping effect variations with the help of the inertia in a mass.

Figure 1:
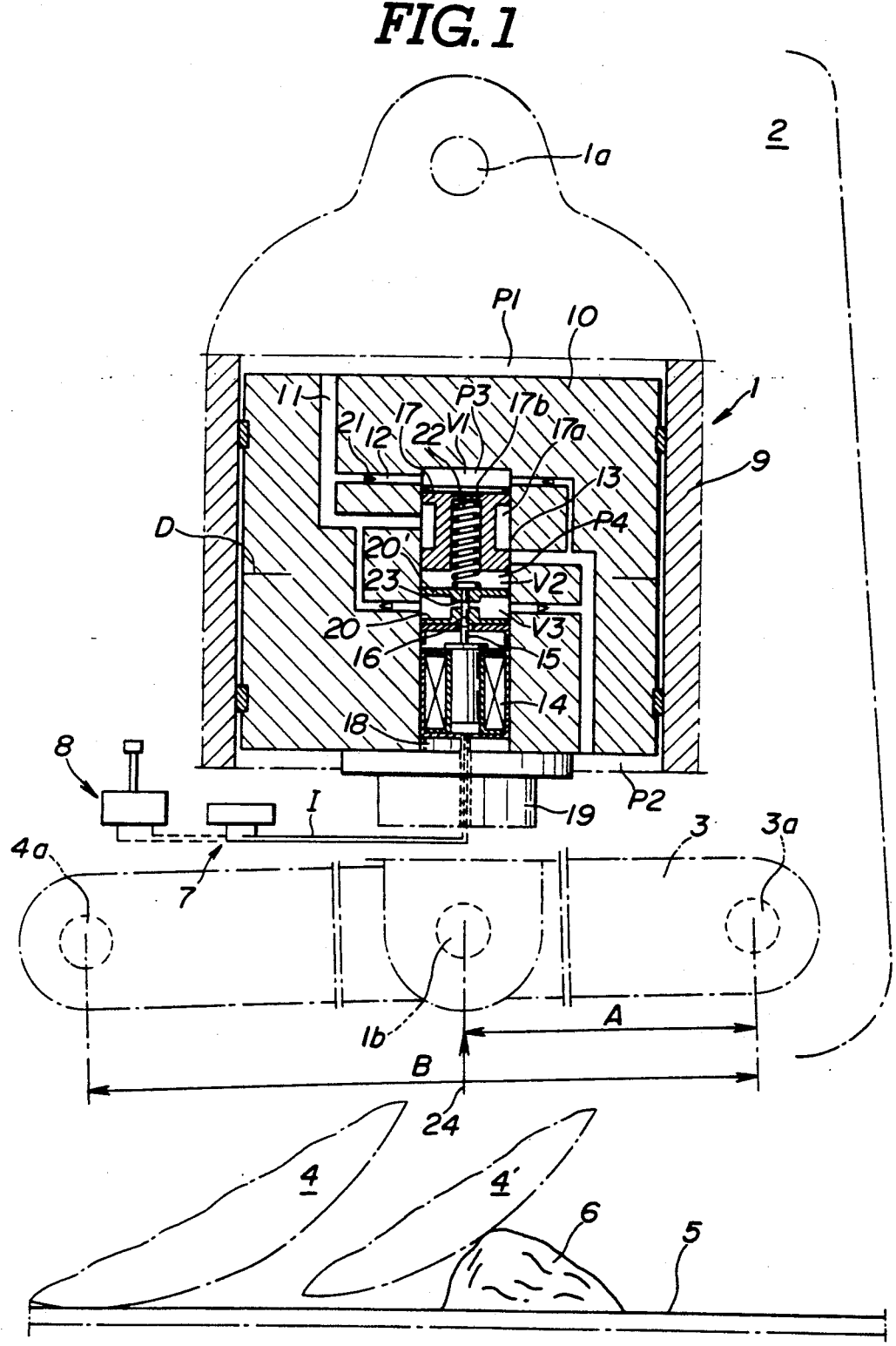
FIG. 1 shows in vertical view and partial cross section the assembly of a shock absorber in a vehicle chassis and in a wheel suspension link with associated wheel.

The most important parts of a shock absorber 1 for the invention are shown in FIG. 1. A chassis is represented with 2 and the shock absorber is at its upper part mounted in the chassis in a bearing 1a. The chassis also supports a suspension link 3 for a wheel 4. The bearing point of the link in the suspension chassis is indicated with 3a. The bottom of the shock absorber is mounted in the suspension link at a bearing point 1b. The bearing point of the wheel in the link is indicated with 4a. A pavement or other driving surface is indicated with 5. An obstacle projecting from the surface 5 is indicated with 6. The wheel 4 is shown in two positions 4 and 4', where the latter position 4' refers to the instance when the wheel strikes the projecting obstacle 6 (rock, railway track, etc.).

The shock absorber shown in the embodiment example is of the kind which is controllable with the help of control signals from one or more external control units 7, 8 etc. The control is effected electrically. The control sets the different damping effects which the shock absorber must be capable of delivering.

The shock absorber comprises a cylinder 9 and a piston 10. The basic construction of the shock absorber can be of the kind which is given in the international patent application PCT/SE85/00120 (WO 85/04698). The piston in such a shock absorber has one or more channels 11 running through it for the principal medium flow. Also included are channels 12 for a pilot flow.

In the piston, the principal medium flow passes a restriction 13 which can be influenced with the help of the aforementioned control signals I, acting on a proportional magnet 14, and with the help of the armature 15 which forms or is connected to a needle-shaped unit 16. The proportional magnet comprises a winding, bobbin etc.

The shock absorber shown also works with a servo function in order to influence the principal medium flow. This servo function comprises a longitudinally movable slide 17 which, together with the proportional magnet, is arranged in a space 18 in the piston. The proportional magnet is connected to the external control units via electric conductors which are arranged in a channel in the piston rod 19 of the piston 10. The piston is sealed in known manner against the inner surface of the cylinder 9.

The pressure above the piston is indicated by P1 and the pressure below the piston is indicated by P2. The channels for the principal medium flow are shown with larger diameters than the channels for the pilot medium flows. The channels have also been shown in one and the same plane for the sake of clarity. In the embodiment, the channels are distributed throughout the piston in a suitable manner. The piston 10 consists of two or more parts which are joined together via a dividing line D which is only "indicated symbolically" because of the manner in which the channels have been illustrated.

In the space 18, two fixed internal walls 20 and 20' are arranged. Three different volumes are thus created. A variable first volume V1 is arranged between the upper end surface of the recess 18 and the upper surface of the slide 17. A second variable volume V2 is formed between the lower surface of the slide 17 and the wall 20'. A fixed third volume V3 is formed between the internal walls 20' and 20. The slide is provided with a lateral recess 17a, to which the principal medium channel 11 is connected and in which the restriction 13 is arranged. Two pilot medium channels are connected to the space V1 and two pilot medium channels are connected to the volume V3. Check valves or one way valves 21 are arranged in the respective pilot medium channels. The slide 17 is arranged with a spring 22 which with its one end bears against a surface on the internal wall 20' and with its other end bears against an inner surface in the slide 17. The aforementioned inner surface is located in an insertion hole for the spring 22 in the slide 17.

The needle 16 is mounted in a recess for it in the wall 20. The needle 16 extends towards a seat 23 formed in the wall 20'. The needle and the seat form a restrictable passage between the spaces V2 and V3. At its upper end, the slide is provided with a recess 17b. Via this recess 17b and the insertion hole for the spring 22, there is a connection between the spaces V1 and V2. In the space V1, there is a pressure P3 which is dependent upon the pressure 10 difference between the pressures P1 and P2 respectively on the upper and lower sides of the piston. Via the recess 17b and the insertion hole for the spring 22, a pilot flow is formed via the space V2, the seat 23 and the space V3. There are four pilot medium channels which work together in pairs. When the pressure P1 exceeds the pressure P2, the pilot flow is formed via the first pair of pilot medium channels. With the opposite pressure conditions between the upper and lower sides of the piston, the second pair of pilot medium channels is connected to form the pilot flow. Hydraulic oil can be used as a medium.

The proportional magnet is characterized by its armature 15 being controllable with the help of the control signal I and being longitudinally movable towards the action of the control force of the proportional magnet. The function is as follows: In the course of the regulating function a pressure P4 is defined in the space V2 by the ratio between the control force of the proportional magnet and the area (needle end area) for the unit 16 (=armature and needle). The unit 16 executes the longitudinal displacement movement towards or away from the seat 23 depending upon changes in the pressure P4. The latter pressure can of course vary as a result of variations in the piston speed, which variations give rise to various differences in the pressure P3. When the pressure P4 as a result of this, tends to increase or decrease, the armature/needle can move in a direction away from or towards the seat 23 respectively so that the pressure P4 assumes at all times a value which corresponds to the control signal. The pilot flow through the seat 23 is thus at all times counterbalanced by the pressure P4 in the space V2.

The unit 16 (the armature/the needle) stands (or rides) on the pilot flow at the seat and is pressed towards the pilot flow by the control force. Variations in the piston speed are in this manner prevented from having undesirable effects on the damping functions. The regulating functions can be arranged so that the damping functions remain independent of the parameter in question over the whole adjustment range or alternatively are dependent in a predetermined manner within the adjustment range.

A changed control signal, i.e. another value of control signal I, gives rise to a corresponding change in the aforementioned ratio. The pressure P4 assumes a new value which corresponds to the change and which is then retained or changed in a predetermined manner within the whole adjustment range independent of variations in the shock absorber parameter in question (the piston speed) and so on.

The pressure P4 is also utilized for a servo function carried out with the slide 17. The position of the slide 17 is defined in response to the pressures P3 and P4, the pressure P3 being defined by the pressure difference existing between the upper and lower sides of the piston, i.e., by P1-P2 or P2-P1, and the pressure P4 being adjustable in accordance with the above. The restriction 13 of the principal medium is dependent upon the position of the slide which is defined by the aforementioned pressures P3 and P4.

A change in the piston speed, for example, tends to change the pressure difference between the upper and lower sides of the piston and thus, changes the pressure P3. The self-regulating function of the slide 17 causes the size of the restriction to be changed by means of the movement of the slide. The change in the size of the restriction tends to counteract the change in the pressure difference between the upper and lower sides of the piston. The pressure P3 is maintained at its assumed value. The aforementioned movement of the slide in the regulating function for the principal medium tends to change the set pressure P4 in the space V2. The latter tendencies are counteracted in turn in the manner stated above and so on.

The regulating function in the shock absorber shown includes two interacting regulating systems, one system controllable with controls for the aforementioned pilot flow and one self-regulating system for the principal medium flow.

The entire regulating function or regulating system described above functions under normal conditions, for example, in a vehicle under normal driving conditions. However, when powerful accelerations occur in the direction of compression in the shock absorber, (see direction of arrow representing force) the regulating function/functions do not have time to finish, but the slide 17 blocks the channel 11 for the principal medium flow. The damping effect from the shock absorber reaches its maximum and the suspension point in question behaves as a rigid suspension point.

According to the invention, the problem is solved by utilization of the inertia in the mass of the needle/the armature. The needle/armature is arranged so that its movement can be influenced by the acceleration force F which occurs in the unit 16, the influence being used to reduce the restriction. The reduction takes place depending upon the aforementioned inertia/acceleration and can be made substantial and momentary and, for example, can last as long as the powerful acceleration is present.

Figure 2A:
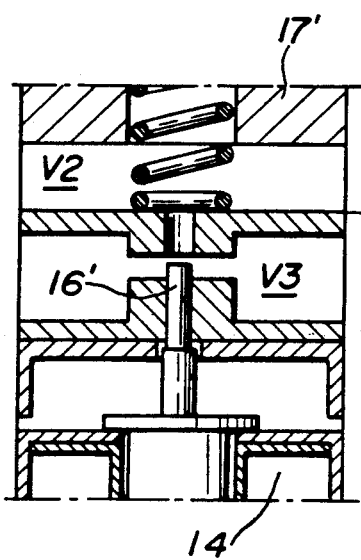
FIG. 2a shows in vertical view and cross section parts of the shock absorber according to FIG. 1 during a first driving instance for the vehicle.
Figure 2B:
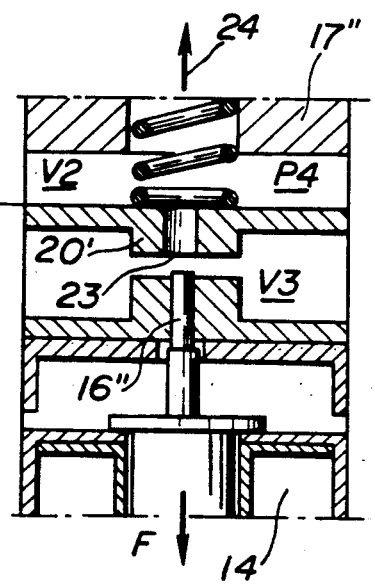
FIG. 2b shows in vertical view and cross section the same parts as in FIG. 2a, but in a second driving instance.
Figure 2B:
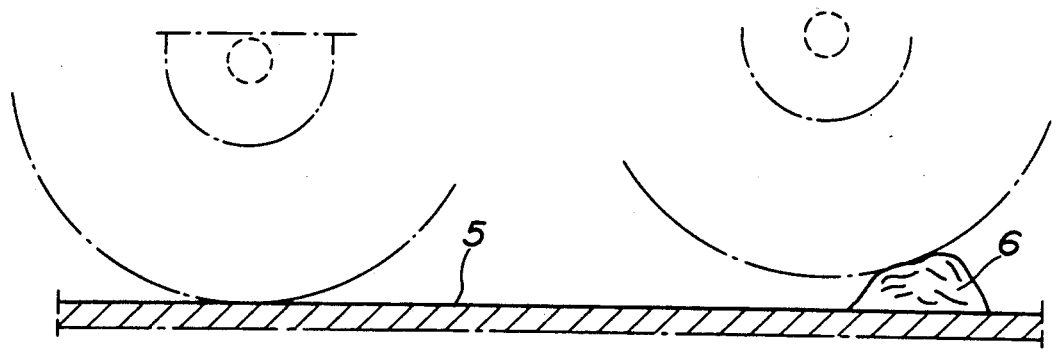

Through the substantial reduction of the restriction 23, the pressure P4 in the space V2 falls considerably with the result that the slide 17 can move towards the internal wall 20, (see FIG. 1). This results in the previously closed principal medium passage 11 being opened, either completely or partially. A corresponding momentary reduction is thus obtained in the damping effect delivered by the shock absorber. In operation, the inertia of or the acceleration force on the slide 17 can also be used in order to bring about the changing of the damping effect which is not determined by the regulating function of the shock absorber. Upon driving over the object 6 projecting from the roadway 5 a change in position, or a tendency to change position, of the shock absorber housing and thus also the seat 23 occurs. This change in position (a) has been indicated in FIGS. 2a and 2b. Also shown in the aforementioned figures is the influence of the acceleration force F on the unit 16, its position being changed to a position which is not determined by the regulating function. The position of the unit as defined by the regulating function is indicated in FIG. 2a with 16'. The position which is not defined by the regulating function is indicated with 16". Correspondingly the positions of the slide 17 are indicated with 17' and 17". The relative movement between the seat (in the wall 20') and the unit 16 occurs takes in the direction of the control force of the proportional magnet 14. When the acceleration ceases, i.e. when the force F ceases, the armature/needle is returned to the position as defined by the regulating function according to FIG. 2a, and so on.

The change in the damping effect of the shock absorber which is not defined by the regulating function is chosen depending upon the mass of the armature/needle and upon the distances A or B (see FIG. 1) between the bearing points of the link 3 and the shock absorber 1 or the link 3 and the wheel 4 respectively. Through the link and the connection of the shock absorber to the link the shock absorber movement is reduced in relation to the movement of the wheel, and the degree of reduction influences the acceleration.

The following relationship applies at all times:

$$F_{tot} = F_{reg} - (k \times F_{acc}),$$

where $F_{tot}$ = the total (resultant) force which acts on the needle/armature.

$F_{reg}$ = the force generated by the regulating function.

$k$ = represents a constant built in to the construction (gearing = distance A/distance B (FIG. 1)).

$F_{acc}$ = acceleration force = Mass × Acceleration × gearing/amplification (for example, the aforementioned needle area/the area on the end surface of the slide 17 facing the space V2).

Figure 3:
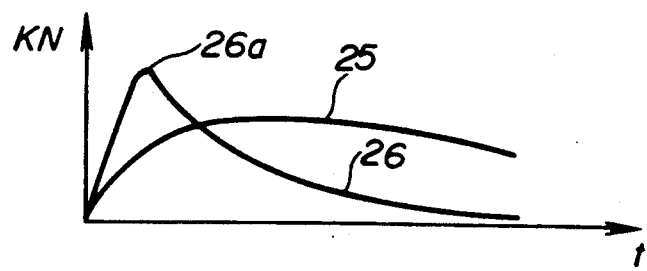
FIG. 3 shows in diagram form a force/time curve for the damping function in the shock absorber.

In FIG. 3, the force/time curves are indicated at 25 for the invention and at 26 without the invention. The curve 25 shows that the inventive shock absorber force initially climbs in a curve from the zero value into a substantially horizontal curve section for the maximum value of the damping effect and then slowly reduces with time. The prior art curve 26 initially comprises a steep peak 26a with a high damping effect value, whereupon the curve falls relatively quickly. By virtue of the invention, the disadvantage associated with the aforementioned initial peak value can be eliminated.

In FIG. 4, a shock absorber cylinder 27 is shown in part with associated piston 28, which is sealed against the interior of the cylinder by a sealing ring 29. The piston rod is indicated with 30. The piston is provided with first passages 31 and 32 running through it. In the operating instance shown, the pressure P' on the upper side of the piston exceeds the pressure P" on the lower side of the piston with the result that the medium, for example hydraulic oil, flows in the direction of arrows 33, 34 from the upper side to the lower side. The size of the medium flows 33, 34 is determined by elements (shim washers) of known type, which are deflectable depending upon the size of the pressure difference P' − P" which occurs.

The piston also supports an element influencable by acceleration forces 36, 36' which includes a body 37 supported by two or more elements 38, 39 in the piston 28. The respective elements extend through holes 40, 41 running through the piston. The upper side of the piston are formed with enlarged sections 38a, 39a and the lower side of the piston with seat sections 38b and 39b respectively. Counterbalancing elements or springs 42 and 43 respectively hold the element 37, 38, 39 in a starting position which exists as long as no acceleration forces act upon the mass of the element.

Second medium passages which are formed between the outer sides of the element 38 and 39, and the inner sides of the holes 40 and 41 are closed in the starting position (or alternatively open to a predetermined extent). Upon the occurrence of acceleration forces (= function standstill in FIG. 4) which act on the mass of the element, the element is displaced longitudinally in its bearing in the piston. The passages are opened (changed/increased) at the seats 38b, 39b. Second medium passages 44, 45 are formed (changed/increased) between the upper and lower sides of the piston. When the acceleration forces cease, the element 37, 38, 39 is returned (longitudinally moved back) by the springs 41, 42 and so on.

The shock absorber is also equipped with a second set of elements (shim washers) 35', for determining the size of flow, which control the flow 33', 34' in two or more further passages 31', 32' running through the piston 28 when the pressure P" exceeds the pressure P'. The control is effected depending on the existing pressure difference P"−P'.

Likewise this pressure difference or this damping direction can be allocated to a mass or body, not shown, which corresponds to the mass or body 37 and which then is mounted in the piston 28 in a corresponding manner, with elements and springs which correspond to the elements 38, 39 and the springs 42, 43.

The expression, "momentary influence" according to means a rapidly transmitted influence, which is completely supervised or controlled in the function effected to influence the damping effect. The latter can, for example, be connected for 1–10% of the total damping effect time. The element or body determining the size of the flow must have a mass which is small enough to be affected by the acceleration but not less than one gram.

The invention is not limited to the embodiment given above as an example, but can be subjected to modifications within the scope of the following patent claims and the inventive concept.

I claim:

1. A shock absorber having a variable damping function, said shock absorber comprising:
   (a) a piston which is slidable within a cylinder of the shock absorber;
   (b) a principal medium passage for a principal fluid medium flow, said principal medium passage enabling said fluid medium to be transferred from one side to another side of said piston;
   (c) a restriction disposed in a course of said principal medium passage for passing the principal fluid medium flow, the size of said restriction defining the damping effects of the shock absorber;
   (d) a longitudinally movable slide mounted in the course of said principal medium passage, the longitudinal movement of said slide being capable of changing the size of said restriction for controlling the principal fluid medium flow via said restriction from either side of said piston to the other side of said piston;
   (e) a pilot medium passage for enabling a pilot flow by which said fluid medium is capable of being transferred from one side to the other side of said piston;
   (f) a space (V2) facing toward one side of said slide and communicating with said pilot medium passage through a seat which forms a medium passage;
   (g) a proportional magnet having an armature which is movable longitudinally in a direction toward a control force of the magnet which is adjustable in response to electric control signals, the direction of movement of said armature being aligned with a direction of an acceleration force acting on said armature as a result of an acceleration of an object to which the shock absorber is coupled; and
   (h) positional movement means displaced longitudinally along with the direction of the movement of said armature and being movable responsive to said armature relative to the seat,
   said positional movement means and the seat forming a restrictable passage between said space (V2) and said pilot medium passage, and
   the movement of said positional movement means away from or toward the seat changing an amount of the pilot flow from said space (V2) through said seat and into said pilot medium passage, the pilot flow through the seat changing the pressure of said space (V2);
   wherein the position of said slide and the size of said restriction are defined in response to the pressure difference between a first pressure which is the pressure within said space (V2) and a second pressure which is the larger of the pressures at the upper and lower sides of said piston;
   the control force of said proportional magnet regulating the damping effects of the shock absorber;
   and an inertial mass of said armature producing a relative displacement movement in response to an acceleration force acting on said armature as a result of an acceleration of said object to which said shock absorber is coupled so that the damping effects of the shock absorber is adjusted.

2. The shock absorber according to claim 1, characterized in that the displacement movement which takes place in a direction toward a control force which, when the acceleration force stops, gives the inertial mass a relative return movement with a result that the adjustment of the damping effects by means of the inertial mass of said armature ceases.

3. The shock absorber according to claim 1, characterized in that the acceleration takes place in a direction which compresses the shock absorber and in that an adjustment of the damping effect provides a significant reduction thereof.

4. The shock absorber according to claim 1, characterized in that said positional movement means is a needle having an end area, and in that a ratio between the control force and the end area determines an amount of the first pressure which counterbalances a pilot flow passing the seat as long as an acceleration does not occur.

5. The shock absorber according to claim 4, characterized in that the first pressure is also utilized in a servo function effected with the longitudinal movement of said slide, the first pressure acting on a first end of said slide and the second pressure acting on a second end of said slide.

6. The shock absorber according to claim 5, characterized in that the adjustment of the damping effects causes a reduction in the first pressure, with a result that the longitudinal movement of the slide significantly increases the size of said restriction for the principal medium flow.

7. The shock absorber according to claim 5, characterized in that when the acceleration ceases, said armature and the needle responsive to said armature return the needle to positions set by steady state regulating functions which restores the first pressure.

8. The shock absorber according to claim 1, and at least one spring for moving said slide to a given starting position.

9. The shock absorber according to claim 1, and means responsive to the first pressure for providing a servo function associated with the longitudinal movement of said slide, wherein the first pressure acts on a first end of said slide and the second pressure acts on a second end of said slide.

10. The shock absorber according to claim 9, and means responsive to said adjustment to cause a reduction in the first pressure, the longitudinal movement of the slide significantly increasing the size of said restriction for the principal medium flow in response to said reduction in the first pressure.

11. The shock absorber according to claim 9, and means responsive to an end of acceleration for returning said armature and the needle to a position set by the regulation functions, and for restoring the first pressure to a condition which is normal in an absence of acceleration.

* * * * *